Oct. 30, 1934.  R. LEMAIGNEN  1,979,163
SPEED INDICATING DEVICE
Filed June 27, 1929

INVENTOR
Robert Lemaignen
BY
Gill + Jennings
ATTORNEYS

Patented Oct. 30, 1934

1,979,163

UNITED STATES PATENT OFFICE 1,979,163

SPEED INDICATING DEVICE

Robert Lemaignen, Paris, France, assignor to Mechanical and General Inventions Company, Limited, London, England, a company of Great Britain Application June 27, 1929, Serial No. 374,192 In Great Britain July 9, 1928

1 Claim. (Cl. 235—104)

I have filed an application in England dated 9th July, 1928.

This invention relates to apparatus for registering the operation of machinery, and has for its object to provide an apparatus for registering the speed, periods of starting and stopping and, if desired, also indicating the speed of all kinds of machinery whether travelling on land, sea or in the air or of stationary engines.

According to the present invention the apparatus is driven by the machine to be controlled and the operation of the apparatus is controlled by a clockwork. The apparatus serves to move a pointer in front of a graduated dial for the purpose of indicating the speed of travel of the machine.

The invention will now be described with reference to the accompanying drawing.

Figure 1:
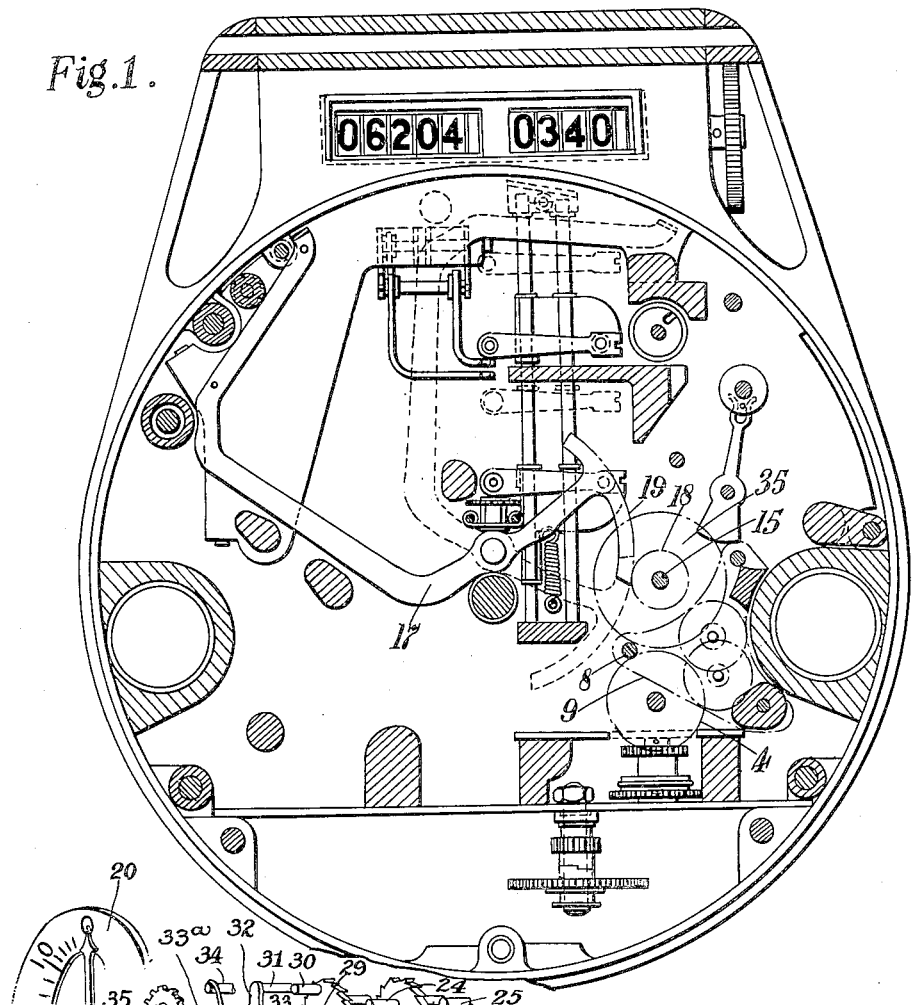
Figure 1 shows a sectional elevation of the apparatus.

In the example of construction illustrated a toothed wheel 1 is driven by the machine, of which the speed is to be indicated, by means of a flexible shaft (not shown). The toothed wheel 1 is mounted on a shaft 2 rotatably mounted in a lever 7 pivotally mounted on a shaft 8 in bearing plates 9, which lever 7 is periodically rocked as hereinafter described by a clockwork mechanism.

A pair of pawls 10 and 11 are pivotally mounted on a shaft 12 and are adapted to be rocked by the clockwork mechanism as hereinafter described. The toothed wheel 1 is adapted to drive indicating mechanism consisting of three groups of members.

The first group consists of a toothed wheel 13 preferably formed as a ratchet wheel which engages with the wheel 1, and is secured to a sleeve or boss 14 loosely mounted on a shaft 15 to which a pointer 16 (Figure 8) is secured or which serves to actuate an arm 17 (Figure 1) through intermediate gearing 18, 19. The pointer 16 is adapted to move in front of a graduated dial 20. The toothed wheel 13 is under the action of a spring 21, preferably coiled around the shaft 15 and having one end attached to the toothed wheel 13 and the other end attached to a fixed point 22 of the casing of the apparatus, which tends to turn the toothed wheel 13 in the opposite direction to that in which it is turned by the wheel 1. On opposite faces of the wheel 13 are provided projections or pins 23, 24, the pin 23 being adapted to cooperate with a pin 25 fixed to the casing and arranged in the path thereof. The pin 24 is adapted to co-operate with a corresponding pin 26 on a toothed wheel 27 of the second group of members, this latter toothed wheel 27 being secured to a boss or sleeve 28 loosely mounted on the shaft 15. This wheel 27 is urged, by a spring 29 arranged in the same manner as the spring of the first group, so as to urge the toothed wheel 27 in a direction so as to bring the pin 26 into engagement with the pin 24 on the wheel 13.

The toothed wheel 27 of the second group is provided with a second pin 30 which is adapted to co-operate with a pin or projection 31 on a lever 32 secured to a boss or sleeve 33 keyed to the shaft 15. This lever 32 is urged in the same direction as the toothed wheels 13 and 27 by means of a spring 33ª of which one end is secured to a fixed point 34 of the casing and the other end to a toothed wheel 35 (Figure 2) keyed to the shaft 15. The lever 32, pin 31, toothed wheel 35 and spring 33ª form the third group of members. The toothed wheel 35 is connected to an air brake 36 (Figures 1 and 2) through the medium of a train of gears 37, said train including a pawl and ratchet device 38, 39 so as to enable the toothed wheel 35 to be moved without the action of the brake when it is driven for the purpose of indicating, but the ratchet device 38, 39 coming into operation so as to cause the air brake to act when the wheel 35 is being restored to its normal inoperative position by the spring 33ª. It will, however, be understood that any other suitable retarding mechanism may be used, such as for example a clockwork escapement.

With the two wheels 13 and 27 of the first and second groups there co-operate the pawls 10, 11 (Figure 2) which are pivotally mounted on the same shaft 12. These pawls 10, 11 and the lever 7 are actuated by cams 40, 41, 42 against which they are held by springs 43.

Figure 2:
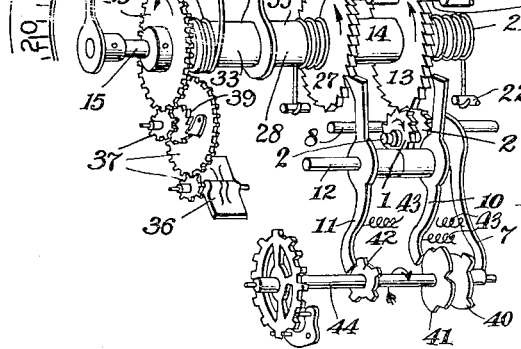
Figure 2 shows a perspective view of the mechanism for actuating the pointer.

The cams are keyed to a shaft 44 driven by the clockwork mechanism of which the escapement wheel is shown at 45, in such a manner that when the wheel 1 is in engagement with the wheel 13 the pawl 10 will be out of engagement with the wheel 13 and the pawl 11 is in engagement with the wheel 27 (positions shown in Figure 2). When the wheel 1 is disengaged from the wheel 13 the pawl 10 engages with said wheel 13 and the pawl 11 is disengaged from the wheel 27, after a short time the pawl 11 comes into engagement with the wheel 27 and the pawl 10 is disengaged from the wheel 13 which is returned toward its starting point under the action of the spring 21. After a short time, the pawl 10 again engages with the wheel 13 and the sequence of operation is repeated. As the wheels 13, 27 are preferably ratchet wheels, the wheel 1 is also preferably a ratchet wheel, and the engagement between the wheel 1 and the wheel 13 is such that the substantially radial faces of the teeth of the wheels come into engagement with one another in the driving direction.

With the mechanism as above described it will be seen that when the wheel 1 is driven it drives the first group, and the first group, through the co-operation of the pins 24, 26 drives the second group as soon as the pin 24 comes into engagement with the pin 26 on the wheel 27 of the second group. The pin 30 of the wheel 27 drives the third group as soon as the said pin 30 comes into engagement with the pin 31 on the lever 32.

By reason of the cams 40, 41, 42 driven by the clockwork 45 and acting on the pawls 10, 11 and the lever 7, carrying the wheel 1, the wheel 1 is periodically engaged with the wheel 13 of the first group and causes it to return through a variable angle which is a function of the speed of the machine of which the operation or the like is to be indicated. The first group drives the second group through the medium of the pins 24 and 26, the second group driving the third group through the medium of the pins 30 and 31 and at the moment that the wheel 1 is disengaged from the wheel 13 the pawl 10 engages with the said wheel 13 and holds it in the position into which it has been brought while the pawl 11 is disengaged from the wheel 27 and after a short time again engages with the wheel 27 which is thus held in the position into which it has been brought by the spring 29. The pawl 10 is thus disengaged from the wheel 13 which returns to its starting position under the action of its spring 21. The wheel 1 is then again brought into engagement with the wheel 13 and if it causes the first group to turn through a larger angle this first group drives, as above described, the second and third groups. If the wheel 1 causes the wheel 13 to turn through a smaller angle than during the previous operation then with the pawl 11 disengaged from the wheel 27 this turns rearwardly under the action of the spring 29 until its pin 26 comes into contact with the pin 24 of the first group and the third group also turns rearwardly under the action of its spring 33ᵃ until the pin 31 comes into contact with the pin 30, this return movement of the third group being retarded by the brake 36.

With this arrangement the first group serves to measure the speed during a predetermined time and returns to zero. At the end of each operation the second group rectifies its position so as to take up a position corresponding with that of the last operation made and retains this position during a period of time during which the measuring operation takes place, the third group following the movement of the second group but at a reduced speed when moving backwardly.

I claim:—

In an apparatus for registering the speed of machines and the like, a shaft, a pair of toothed wheels mounted for free independent rotation on said shaft, a driving element constantly driven by the machine whose speed is to be indicated, said element cooperating intermittently with one of said toothed wheels whereby said toothed wheel is driven positively intermittently away from its normal position, the other of said toothed wheels being intermittently responsive to the movement of the first mentioned wheel, independent means connected to each of said wheels for moving said wheels toward their normal position when said wheels are free from operating influence, a pawl cooperating with each of said wheels, a lever carrying said driving element, a second shaft, cams on said second shaft, said cams cooperating with said pawls and said lever so as to hold the second mentioned wheel against movement when the first mentioned wheel is being driven by the driving element and to hold the first mentioned wheel against movement when the second mentioned wheel is free of its pawl, a driving member secured to the first mentioned shaft and intermittently operated by and following a predetermined movement of the second mentioned wheel, means tending to move said driving member towards its normal non-indicating position, a time lag device cooperating with said driving member so as to insure a uniformly retarded return movement of said member, and means included in said time lag device to render said device inoperative when the driving member is being driven by the second toothed wheel.

ROBERT LEMAIGNEN.